United States Patent [19]

Schumacher

[11] Patent Number: 4,860,600
[45] Date of Patent: Aug. 29, 1989

[54] THREE DEGREE OF FREEDOM MICRO-GRAVITY SIMULATOR

[76] Inventor: Larry L. Schumacher, 18876 Tenderfoot Trail, Newhall, Calif. 91321

[21] Appl. No.: 129,700

[22] Filed: Dec. 7, 1987

Related U.S. Application Data

[63] Continuation-in-part of Ser. No. 40,060, Apr. 20, 1987, abandoned.

[51] Int. Cl.[4] .................................................. B64G 7/00
[52] U.S. Cl. ..................................................... 73/865.6
[58] Field of Search ............................ 73/865.6; 434/34

[56] References Cited

U.S. PATENT DOCUMENTS

| | | | |
|---|---|---|---|
| 3,161,968 | 12/1964 | DeBoy et al. | 434/34 |
| 3,449,843 | 6/1969 | Richter et al. | 434/34 |
| 3,516,179 | 6/1970 | Dane | 434/34 |

OTHER PUBLICATIONS

Washington Daily News, p. 32, Mar. 25, 1965.

Primary Examiner—Stewart J. Levy
Assistant Examiner—Robert R. Raevis

[57] ABSTRACT

The three degree of freedom micro-gravity simulator is a machine system that enables close duplication of three of the six weightless degrees of freedom of a space environment in the gravity field on earth's surface. The three degrees of freedom are two translational degrees of freedom orthogonal to the gravity vector and one rotational degree of freedom parallel to the gravity vector. The mechanism concept that duplicates the weightless environment eliminates all but air bearing forces acting on the object being tested in the plane orthogonal to the gravity vector without adding significant mass to the test object or confining the test object translational or rotational movements in the plane orthogonal to the gravity vector. The machine consists of at least three test object support platforms which permit small test object movements relative to the support platform without applying forces to the test object. The test object movements relative to each support platform are sensed and used to control two support platform translational degrees of freedom to maintain the support platform position relative to the test object.

20 Claims, 4 Drawing Sheets

THREE DEGREE OF FREEDOM MICRO-GRAVITY SIMULATOR

This application is a continuation-in-part of pending prior application Ser. No. 040,060 filed on Apr. 20, 1987 of Larry L. Schumacher for Three Degree of Freedom Micro-Gravity Simulator, now abandoned.

FIELD OF THE INVENTION

The three degree of freedom micro-gravity simulator is a machine system that enables close duplication of three of the six weightless degrees of freedom of a space environment in the gravity field on earth's surface.

BACKGROND OF THE INVENTION

A body in the weightless space environment has three translational, force free, degrees of freedom, and three rotational, torque free, degrees of freedom unless acted upon by external forces. A body on the surface of the earth always has gravity, atmospheric friction, and other forces acting on it limiting its force free or torque free movements.

As the commercialization of space proceeds, it is necessary to evaluate the gravity free performance of many devices and structures to be used in the weightless environment prior to their use. At the present time a full six degree of freedom evaluation requires a trip into earth orbit. Efforts to reduce the cost and complexity of testing in a weightless environment have resulted in attempts to simulate a reduced number of force and torque free degrees of freedom on the earth's surface. Examples of these attempts include the NASA's large buoyancy tank of water for astronought training and facilities for suspending structures to be evaluated from long strings attached to overhead structure. In the above examples the effects of gravity on a test object can be offset to some extent by vertical support forces, but generally the support mechanisms also introduce forces on the test object orthogonal to the gravity vector and restricts the amplitude or velocity of motion. Accordingly, it is the object of this invention to provide test object support with the following characteristics:

- two force free degrees of freedom orthogonal to the gravity vector, one torque free degree of freedom about an axis parallel to the gravity vector,
- large amplitude translation or rotation of the test object in the plane orthogonal to the gravity vector,
- minimum changes in test object mass and inertia properties.

SUMMARY OF THE INVENTION

The invention is a means for eliminating all forces acting on a test object in the plane orthogonal to the gravity vector without adding significant mass to the test object, for permitting test object translations of a few meters in any direction in the plane orthogonal to the gravity vector, and for permitting test object rotations about the gravity vector limited only by the translational limitations.

The test facility has a flat planer structure called the reference plane orthogonal to the gravity vector. Conceptually, a test object supported from below requires at least three supporting platforms positioned to prevent test object tipping. Each supporting platform has spherical rollers providing two degree of freedom rolling support relative to the reference plane. The supporting platforms are driven in two orthogonal directions parallel to the reference plane relative to a tracked structure attached to the reference plane.

Each supporting platform has vertical columns topped with flat planer air bearings that support the weight of the test object but will not transmit supporting platform acceration forces orthogonal to the gravity vector or torques around the gravity vector to the test object. The test object is supported with three degrees of rotational freedom relative to the air bearing surface by a lightweight ball and socket structure. A sensor system determines the position of the air bearing surface attached to the test object relative to the air bearing surface attached to the supporting platform and provides a control error signal to the platform positioning system which keeps the supporting platform centered under the test object air bearing surface.

The supporting platform positioning system consist of a track fixedly attached to the reference plane structure, platform translation structures, and platform drive motors. The track defines one degree of supporting platform translational freedom orthogonal to the gravity vector. The platform translation structures are configured in a tee shape with one side parallel to the track and one side orthogonal to the track. Two platform drive motors are attached to the translation structure on the structure parallel to the track and drive pinion gears relative to a rack fixed to the track. The platform drive motors torque with opposing polarities but different magnitudes which translates the structure along the track without mechanical backlash. The platform translation structure orthogonal to the track is supported by a wheel relative to the reference plane structure with motor driven capstans attached on each end of the platform translation structure with a cable wrapped around both capstans and attached to the platform. The cable translates the platform orthogonal to the tracks without mechanical backlash by assigning each capstan motor opposing control torque polarities but different torque magnitudes.

DETAILED DESCRIPTION OF THE INVENTION

Figure 5:
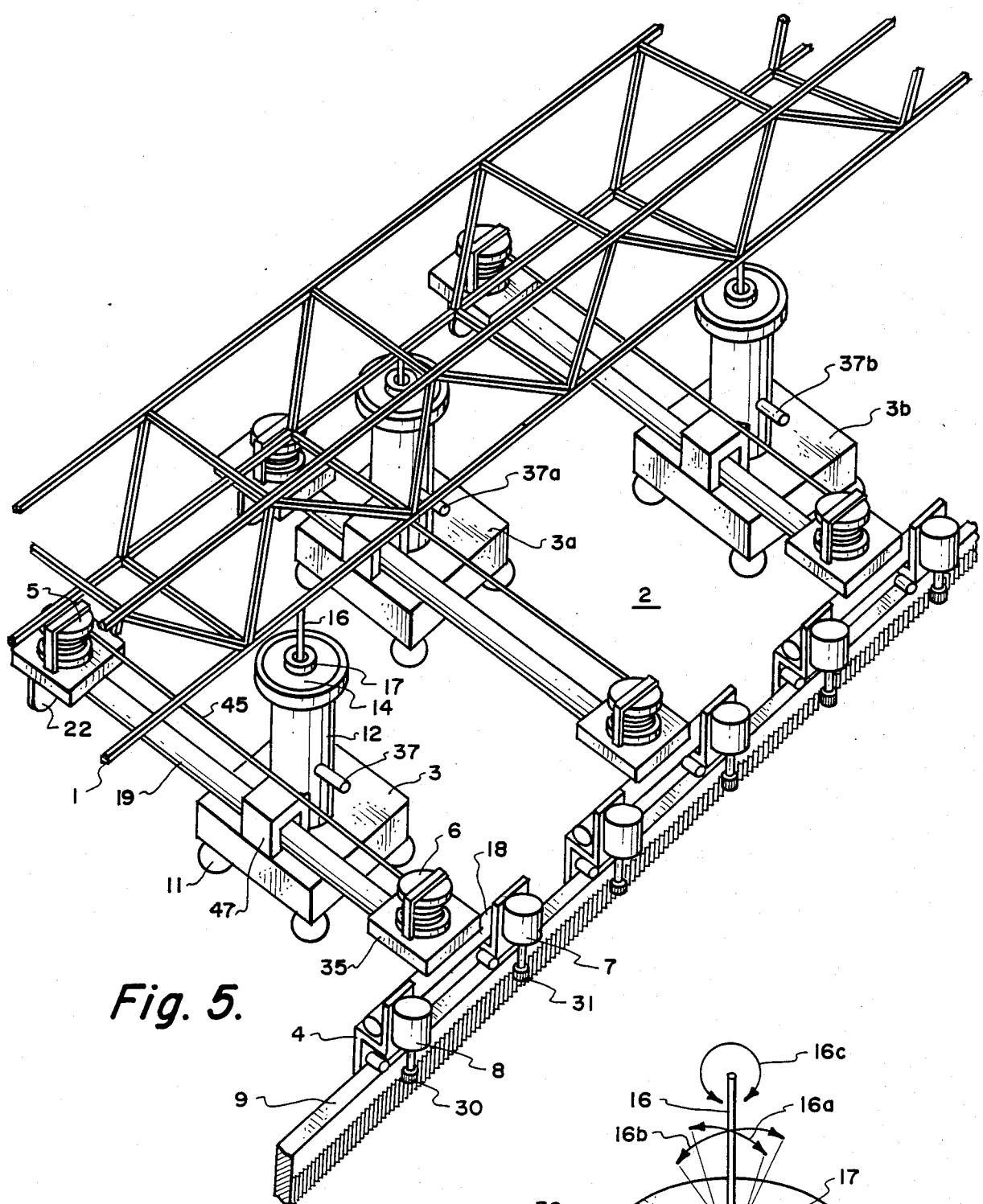
FIG. 5 illustrates three micro-gravity simulator support units supporting a test object.

FIG. 5 illustrates a large test object 1 being supported relative to reference plane structure 2 by at least three test object support units 3,3a,3b. Air bearing supply lines 37,37a,37b are provided with air by lines not shown. Track 9 is fixedly attached to reference plane 2 and is the means to transfer translation forces from support units 3,3a,3b to reference plane 2.

Figure 6:
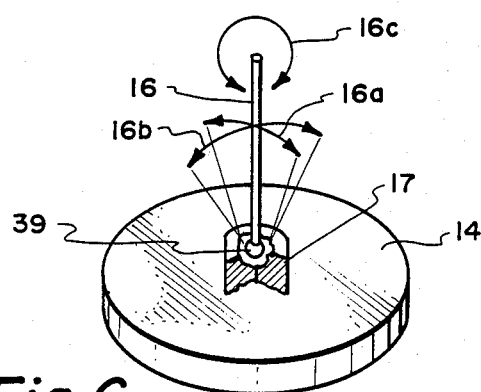
FIG. 6 illustrates the ball and socket rotational isolation structure supporting the test object relative to the air bearing surface.

FIG. 6 illustrates rotational isolation means consisting of structure 16 fixedly attached to test object 1, hemispheric end piece 39 attached to structure 16 and hemispheric socket 17 fixedly attached to floating air bearing surface 14. Rotational movements of test object 1 result in small angular movements 16a, 16b, and 16c of structure 16 which are isolated from surface 14 by rotation of hemispheric end piece 39 in the hemispheric socket in structure 17.

Figure 1:
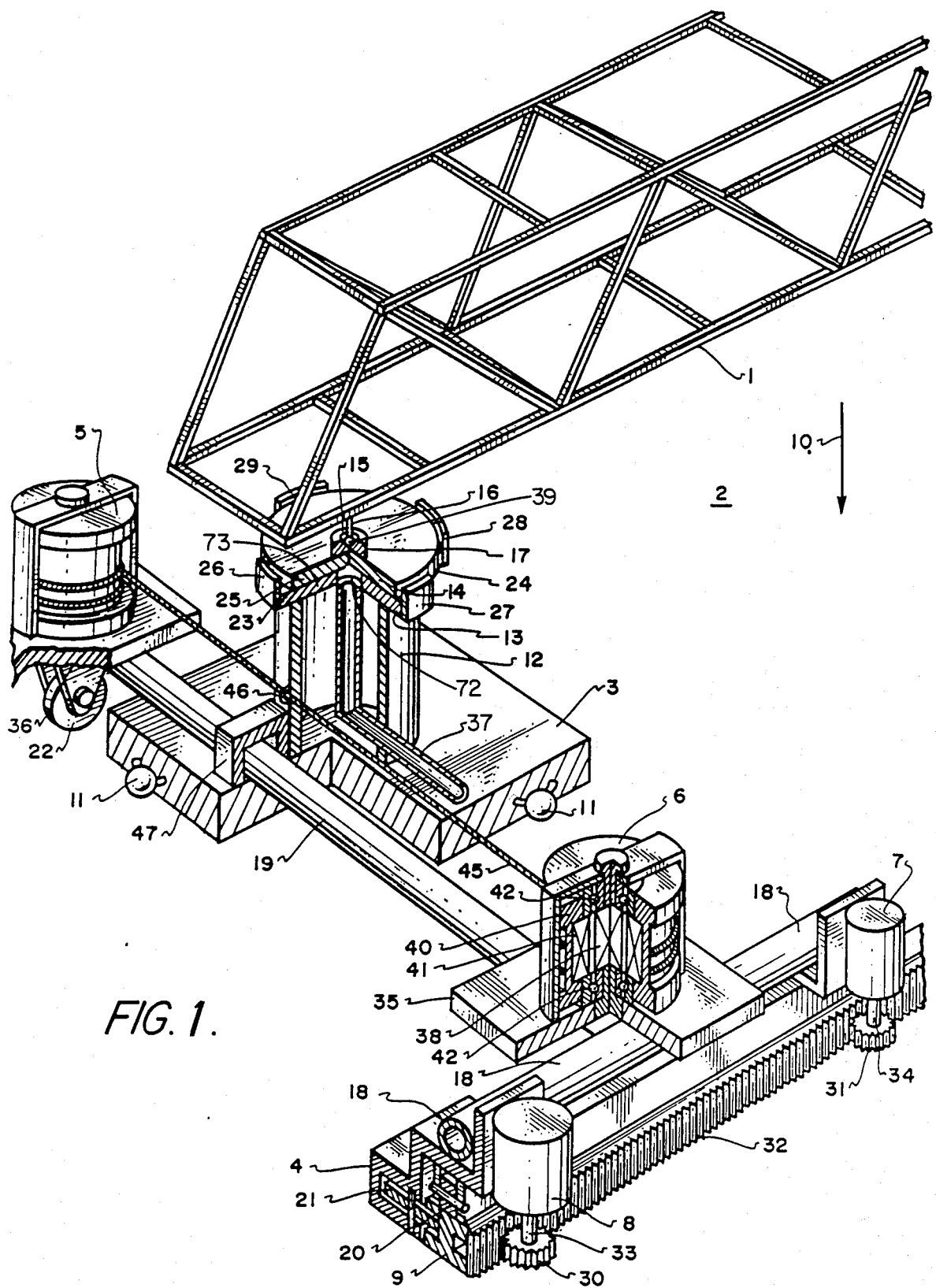
FIG. 1 illustrates the preferred embodiment of one micro-gravity simulator support element.

FIG. 1 illustrates one micro-gravity simulator test object support unit consisting of test object support platform 3, support platform translation structure 4, drive capstans 5,6, track driver motors 7,8, and track 9. Reference plane structure 2 is a rigid plane structure orthogonal to gravity vector 10. Test object support platform 3 is structure supported relative to plane 2 by two degree of freedom rollers 11 which support the weight of test object 1 with low rolling resistance in the two translational degrees of freedom in plane 2. Column 12 is fixedly attached orthogonal to platform 3 and fixedly attached to circular reference air bearing surface 13. Circular floating air bearing surface 14 is supported relative to circular reference surface 13 by a cushion of air 73 provided by air supply line 37 which is attached to air supply port 72 in the approximate center of surface 13. The circular diameter of reference air baring surface 13 is larger than circular diameter of floating air bearing surface 14.

Test object 1 is supported relative to surface 14 by structure 16. Structure 16 is a lightweight, rigid attachment to the test object 1 intended to provide support functions without adding significantly to test object mass or inertia. Structure 16 has an external hemispheric end piece 39 fixedly attached that is force by the weight of test object 1 into a hemispherical socket 15 in structure 17 attached to the center of surface 14. The mating hemispherical surfaces of 39,15 permits angular movement of 16 relative to 17 without translational slippage between surfaces of 15,39.

Forces parallel to plane 2 created by the test object n structure 17 cause surface 14 to translate relative to surface 13 resisted only by the extremely small friction force of air cushion 73. The forces on the test object parallel to plane 2 due to the difference between the linear acceleration of test object 1 and test object support platform 3 are not transmitted to test object 1 because surface 14 attached to the test object 1 may translate a small distance parallel to plane 2 without contacting surface 13 attached to platform 3. This non contacting translational distance between surfaces 13 and 14 permits the test object support platform 3 positioning system a time delay necessary to match the acceleration of the platform 3 to any acceleration of test object 1.

The translation of surface 14 relative to surface 13 is sensed by noncontacting electrical capacitive surfaces 24 attached by insulating structure 25 to the periphery of floating surface 14, and capacitive surfaces 26,27,28,29 fixedly attached by insulating structure 23 to reference structure 13 approximately parallel to surface 24. Non contacting sensor surfaces between surfaces 13 and 14 produce no external forces on test object 1.

The platform translation structure 4 consists of structures 18,19 and translation drive mechanisms 5,6,7,8. The platform translation structure 4 is configured as a rigid tee shape with structure 18 parallel to track 9 and structure 19 orthogonal to track 9. Roller 20 supports the weight of structure 18 and drive motors 7,8 relative to track 9 and roller 21 constrains platform structure 4 to move approximately parallel to track 9. Wheel 22 provides rolling support relative to plane 2 for the weight of structure 19 and capstans 5,6 not supported by track 9.

The platform 3 and structure 4 are translated parallel to track 9 by motors 7,8 which are attached to structure 18. Gears 30,31, fixedly attached to motor shafts 33,34, interact against gear rack 32 fixedly attached to track 9 to translate structure 4 parallel to track 9. Platform 3 is intended to be translated by translation structure 4 such that air bearing surface 14 remains approximately centered relative to air bearing surface 13 while supporting the weight of test object 1 without producing any forces on test object 1 parallel to plane 2.

Platform 3 is translated orthogonal to track 9 by capstans 5,6 which are driven relative to mounting structures 35,36 which are attached to structure 19. Capstan drive motor stator 38 is fixedly attached to mounting structure 35. Capstan cable drum 40 is fixedly attached to motor rotor 41 and mounted on bearings 42 relative to stator 38. Electrically troquing rotor 41 relative to stator 38 causes cable drum to rotate around stator 38 and cable 45 to wrap around drum 40. Cable 45 is fixedly attached to platform 3 at 46. Structure 47 is fixedly attached to platform 3 constraining platform 3 to move parallel to structure 19. In order to smoothly translate platform 3, it is necessary to minimize the effects of motors 7,8 and capstans 5,6 rotational non linearities during rotational polarity changes such as sticktion friction and mechanical backlash. Rotational non-linearities are eliminated when one motor is assigned the positive drive torque polarity with a small constant positive bias torque and one motor is assigned the negative drive torque polarity with a small constant negative bias torque which results in cable 45 always being in tension, and platform 3 can be translated relative to structure 19 by controlling the magnitudes of the commanded capstan control torques.

Figure 2:
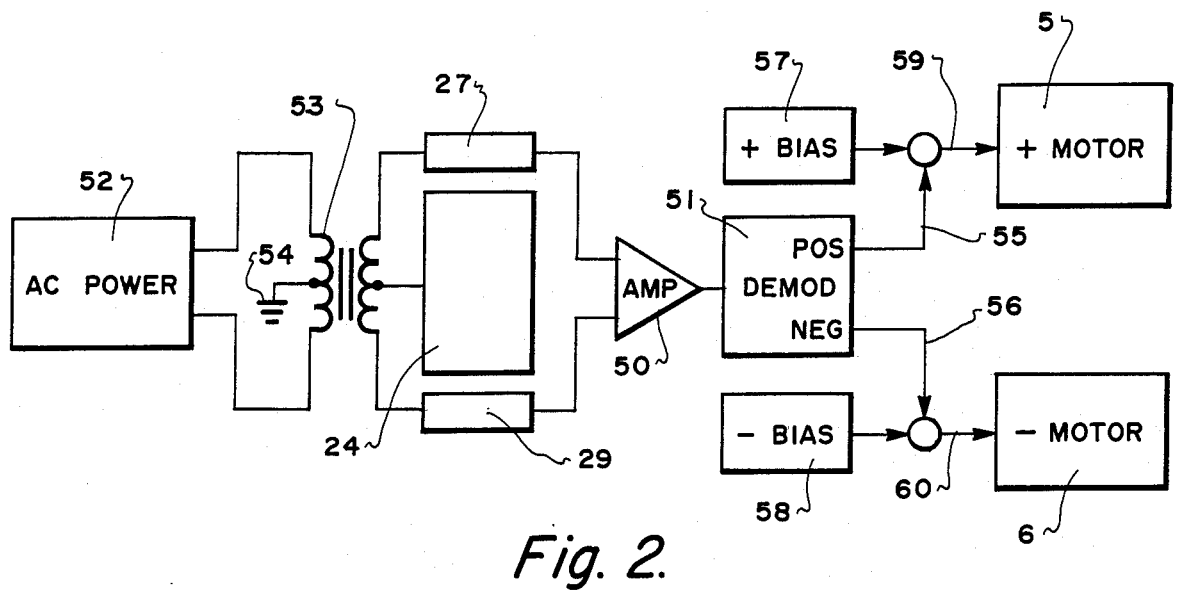
FIG. 2 illustrates a functional diagram of the preferred embodiment of the translation structure drive orthogonal to the track structure control electronics.

FIG. 2 illustrates a functional electrical circuit for controlling platform capstan motors drive torque. The electronic circuit transforms capacitive electrical characteristics of 24,27,29 to a voltage proportional to the translation of the floating air bearing surface 14 relative to said reference air bearing surface 13 in the translational degree of freedom parallel to structure 19. Each capstan drive motor 5,6 torques with opposing polarity either positive or negative. Capacitive elements 27,29 provide electrical characteristics proportional to the displacement of surface 14 relative to reference surface 13 parallel to structure 19. The AC power supply 52 and transformer 53 provide a constant magnitude AC power referenced to ground by 54. AC voltage proportional to displacement of surface 14 relative to surface 13 measured by capacitive sensing elements 24,27,29 is amplified by 50 and demodulated by 51 to a DC voltage and sent to motor 5 on 55 if it is positive or sent to motor 6 on 56 if it is negative. A small positive fixed bias is provided by 57 to be added to the positive displacement error 55 producing motor 5 drive current 59. A small negative fixed bias is provided by 58 to be added to negative displacement error 56 producing motor 6 drive current 60. The net translation force provided to platform 3 is the sum of the positive and negative forces provided by motors 5 and 6 through cable 45 which is always in tension due to motor biases 57,58.

Figure 3:
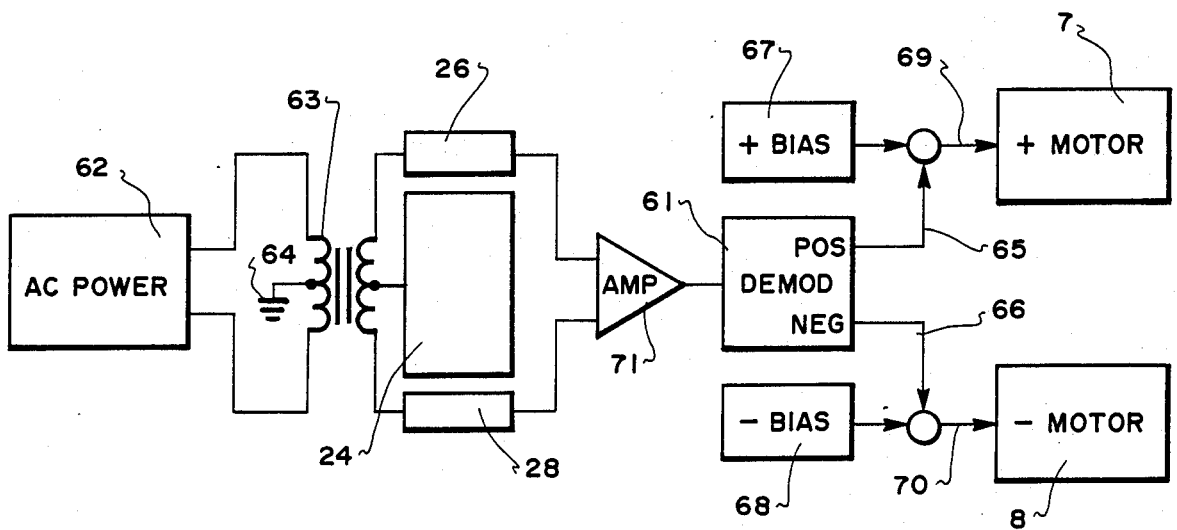
FIG. 3 illustrates a functional diagram of the preferred embodiment of the translation structure drive parallel to the track structure control electronics.

FIG. 3 illustrates a functional electrical circuit for controlling platform track drive motors torque. Each track drive motor 7,8 is driven with one polarity either positive or negative. Capacitive elements 26,28 provide electrical characteristics proportional to the displacement of surface 14 relative to reference surface 13 and parallel to structure 18. The AC power supply 62 and transformer 63 provide a constant magnitude AC power referenced to ground by 64. AC voltage proportional to displacement of surface 14 relative to surface 13 measured by capacitive elements 24,26,28 is amplified by 71 and demodulated by 61 to a DC voltage and sent to motor 7 on 65 if it is positive or sent to motor 8 on 66 if it is negative. A small positive fixed bias is provided by 67 to be added to positive displacement error 65 producing motor 7 drive current 69. A small negative fixed bias is provided by 68 to be added to negative displacement error 66 producing motor 8 drive current 70. The net translation force provided to platform 3 is the sum of the positive and negative forces provided by motors 7 and 8 through gears 30,31 and rack 32 attached to track 9.

Figure 4:
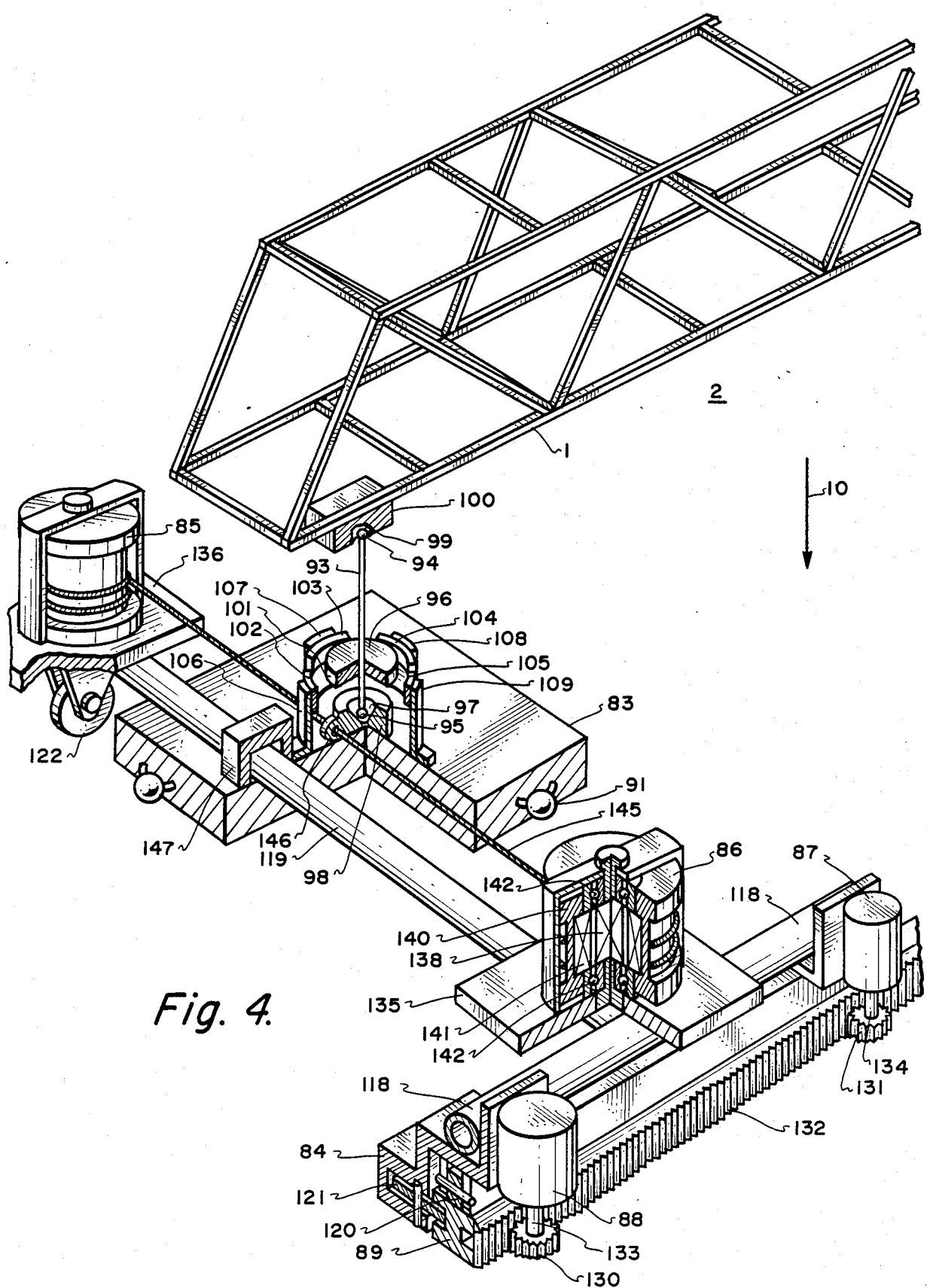
FIG. 4 illustrates an alternate embodiment of one micro-gravity simulator support element.

An alternate embodiment of the three degree of freedom micro-gravity simulator is illustrated in FIG. 4 which illustrates one of at least three micro-gravity simulator test object support units required to support test object 1 relative to reference plane structure 2. Each test object support unit consists of test object support platform 83, support platform translation structure 84, drive capstans 85,86, track drive motors 87,88, and track 89.

Test object support platform 83 is structure supported relative to plane 2 by two degree of freedom rollers 91 which support the weight of test object 1 with low rolling resistance in the two translational degrees of freedom in plane 2. Test object 1 is supported relative to platform 83 by support structure 93. Structure 93 is a rigid member with hemispheric end piece 94 on the test object 1 end, a hemispheric end piece 95 on platform 83 end, and inclination sensing element 96 fixedly attached to structure 93 between end pieces 94 and 95. Hemispheric endpiece 95 is supported in hemispheric socket 97 in structure 98 which is fixedly attached to platform 83. Hemispheric endpiece 94 fits within hemispheric socket 99 in test object attachment 100 which is fixedly attached to test object 1. Mating hemispherical surfaces of 95,97 and 94,99 permits angular movement of 93 relative to 100 and 98 about two orthogonal axes in a plane parallel to plane 2 and about an axis orthogonal to plane 2 without translational slippage between 94,99 or 95,97. During micro-gravity simulation, structure 93 is maintained vertical by translation of platform 83 in response to inclination sensing means signals. Inclination sensing means consists of capacitive surface 101 on element 96 and capacitive surfaces 102,103,104,105 attached by insulating structure to structures 106,107,108,109. Structures 106,107,108,109 are attached to platform 83 to maintain surfaces 102,103,104,105 approximately parallel to surface 101, and to maintain structure 93 erect during non simulation periods. Error signals developed between surfaces 101,102 and 104 drive motors 87,88 and error signals produced between surfaces 101,103,105 drive capstans 85,86.

The platform translation structure 84 consists of structures 118,119 and translation drive mechanisms 85,86,87,88. The platform translation structure 84 is configured as a rigid tee shape with structure 118 parallel to track 89 and structure 119 orthogonal to track 89. Roller 120 supports the weight of structure 118 and drive motors 87,88 relative to track 89 and roller 121 constrains platform structure 84 to move approximately parallel to track 89. Wheel 122 supports the weight of structure 119 and capstans 85,86 not supported by track 89.

The platform 83 and structure 84 are translated parallel to track 89 by motors 87,88 which are attached to structure 118. Gears 130,131 are fixedly attached to motor shafts 133,134, and gears 130,131 interact against gear rack 132 fixedly attached to track 89 to translate structure 84 parallel to track 89.

Platform 83 is translated orthogonal to track 89 by capstans 85,86 which are driven relative to mounting structures 135,136 which are attached to structure 119. Capstan drive motor stator 138 is fixedly attached to mounting structure 135. Capstan cable drum 140 is fixedly attached to motor rotor 141 and mounted on bearings 142 relative to stator 138. Electrically torquing rotor 141 relative to stator 138 causes cable drum to rotate around stator 138 and cable 145 to wrap around drum 140. Cable 145 is fixedly attached to platform 83 at 146. Structure 147 is fixedly attached to platform 83 constraining platform 83 to move parallel to structure 119.

One capstan drive torque polarity and a small constant bias torque magnitude is assigned to capstan 85 and the opposite capstan drive torque polarity with a small constant bias torque magnitude is assigned to capstan 86 resulting in cable 145 always being in tension, and platform 83 can be translated relative to structure 119 by controlling the magnitudes of the capstan torques.

Having described the invention I claim:

1. A mechanism for eliminating all forces orthogonal to the gravity vector on a test object comprising:
    a reference plane structure orthogonal to the gravity vector;
    a test object support means supporting test object weight above said reference plane structure;
    means to permit test object translation free of test object support means acceleration forces parallel to said reference plane structure;
    means to transform test object translation relative to test object support means, and parallel to said reference plane structure, into measurable electrical characteristics proportional to an amount of test object translation;
    means to transform said measurable electrical characteristics into said test object support means translation signals;
    means to translate said test object support means parallel to said reference plane structure;
    means to eliminate effects of mechanical backlash and friction from said means to translate said test object support means; said test object support means being translated away from any measurable translation of said test object parallel to said reference plane eliminating forceful contact with said test object orthogonal to the gravity vector.

2. The mechanism of claim 1 wherein the reference plane structure comprises flat, planer structure orthogonal to the gravity vector supporting the weight of said test object and said test object support means.

3. The mechanism of claim 1 wherein the test object support means supporting test object weight above said reference plane structure comprises at least three translating support platforms, each translating support platform partially supporting said test object above said reference plane structure with two degree of freedom rolling means.

4. The mechanism of claim 3, whereby the means to permit test object translation free of test object support means acceleration forces parallel to said reference plane structure further comprises a vertical support shaft between said test object and said translating support platform with a rotational motion isolation means between said vertical support shaft and said test object and between said vertical support shaft and said translating support platform.

5. The rotational motion isolation means of claim 4 comprises hemispheric end structures fixedly attached to each of the two ends of said vertical support shaft and structures with hemispherical sockets fixedly attached to said translating support platform and fixedly attached to said test object, said vertical support shaft hemispheric end structures being held in said hemispheric sockets by the weight of said test object.

6. Each translating support platform of claim 3 further comprises a vertical support column fixedly attached orthogonal to each translating support platform's structure supported by said two degree of freedom rolling means parallel to said reference plane structure with said vertical support column supporting a circular, planer air bearing.

7. The mechanism of claim 1 wherein the means to permit test object translation free of test object support means acceleration forces parallel to a reference plane structure comprises a circular, planer air bearing having a reference air bearing surface fixedly attached to said vertical support column approximately parallel to said reference plane structure with said reference air bearing surface supporting a floating air bearing surface on a cushion of air with the circular diameter of said reference air bearing surface being larger than the circular diameter of said floating air bearing surface, said floating air bearing surface being attached by a rotational isolation means to said test object.

8. The planer air bearing of claim 7 further comprises a single air supply line attached to a port in the approximate center of said reference air bearing surface providing air to support said floating air bearing surface relative to said reference air bearing surface.

9. The rotational isolation means of claim 7 comprises structure with a hemispherical socket fixedly attached to the center of said floating air bearing surface and structure with a hemispherical end piece fixedly attached to said test object, said hemispherical end piece being held in said hemispherical socket by the weight of said test object.

10. The mechanism of claim 1 wherein the means to transform said test object translation relative to test object support means parallel to said reference plane structure into measurable electrical characteristics proportional to said amount of test object translation comprises a noncontacting sensing means which produce electrical characteristics proportional to the translation of a floating air bearing surface relative to a reference air bearing surface in two translational degrees of freedom parallel to said reference plane.

11. The non-contacting sensing means of claim 10 further comprise capacitive surfaces fixedly attached by insulating structure to said reference air bearing surface approximately parallel to capacitive surfaces fixedly attached by insulating structure to said floating air bearing surface.

12. The mechanism of claim 1 wherein the means to transform said measurable electrical characteristics into said test object support means translation signals comprises an electronic circuit connected by electrically conductive means to capacitive surfaces attached to a reference air bearing surface and connected by electrically conductive means to capacitive surfaces attached to a floating air bearing surface, said electronic circuit transforming capacitive electrical characteristics to a voltage proportional to the amount of translation of said floating air bearing surface relative to said reference air bearing surface in the two translational degrees of freedom parallel to said reference plane structure.

13. The mechanism of claim 1 wherein the means to translate said test object support means parallel to said reference plane structure comprises; means to maintain a floating air bearing surface centered relative to a reference air bearing surface;
means to transfer forces translating said test object support means to said reference plane structure being fixedly attached to said reference plane structure;
support platform translation structure being partially supported by said means to transfer forces translating said test object support means, and being partially supported by said reference plane structure;
support platform translation structure drive motors driving said support platform translation structure relative to said means to transfer forces translating said test object support means.

14. The means to transfer forces translating said test object support means of claim 13 comprises a track structure fixedly attached to said reference plane structure, said track structure having a gear rack fixedly attached to transfer support platform translation forces from support platform translation structure drive motors to said reference plane structure.

15. The support platform translation structure of claim 13 comprises a structure parallel to track structure being supported by roller means on said track structure and a structure orthogonal to said track structure being supported by a wheel structure on said reference plane structure, said structure parallel to said track structure being fixedly attached to said structure orthogonal to said track structure.

16. The support platform translation structure of claim 13 comprise drive motors being fixedly attached to said platform translation structure, said drive motors torque pinion gears against a gear rack to translate said support platform translation structure and said translating support platform parallel to a track structure.

17. The support platform translation structure of claim 13 further comprise electric motor driven capstans attached to each of the two ends of said platform translation structure said platform translation structure being orthogonally connected to track structure with a cable wrapped around and attached to both capstans and fixedly attached to said translating support platform, said electric motor driven capstans troquing with opposing polarities but different magnitudes to maintain said cable in tension while translating said translating support platform orthogonal to said track structure.

18. The means to eliminate effects of mechanical backlash and friction from said means to translate said test object support means of claim 1 comprises control electronics first amplifying, then demodulating a voltage signal that is proportional to the amount of translation of a floating air bearing surface relative to a reference air bearing surface, and routing positive polarity voltage plus a positive polarity constant electronic bias to electronics that drive a positive torque polarity support platform translation structure drive motors, and routing negative polarity voltage plus negative polarity constant electronic bias to electronics that drive negative torque polarity support platform translation structure drive motors.

19. The mechanism of claim 1 wherein the means to transform said test object translation relative to test object support means, and parallel to said reference plane structure, into measurable electrical characteristics proportional to the amount of said test object translation comprises capacitive surfaces fixedly attached by insulating structure to a vertical support shaft and capacitive surfaces fixedly attached by insulating structure to structure fixedly attached to a translating support platform.

20. The mechanism of claim 1 wherein the means to transform said measurable electrical characteristics into support platform translation signals comprises an electronic circuit connected by electrically conductive means to capacitive surfaces fixedly attached by insulating structure to vertical support shaft and to said capacitive surfaces fixedly attached by insulating structure to structure fixedly attached to a translating support platform, said electronic circuit transforming capacitive electrical characteristics to a voltage proportional to the angular inclination of said vertical support shaft relative to structure attached to said translating support platform.

* * * * *